(12) United States Patent
Bartholomew

(10) Patent No.: US 9,066,840 B2
(45) Date of Patent: Jun. 30, 2015

(54) APPARATUS FOR CARING FOR AND CARRYING AN ANIMAL

(71) Applicant: Patricia L. Bartholomew, Flint Hill, VA (US)

(72) Inventor: Patricia L. Bartholomew, Flint Hill, VA (US)

(*) Notice: Subject to any disclaimer, the term of this patent is extended or adjusted under 35 U.S.C. 154(b) by 5 days.

(21) Appl. No.: 14/190,737

(22) Filed: Feb. 26, 2014

(65) Prior Publication Data

US 2014/0174378 A1    Jun. 26, 2014

Related U.S. Application Data

(63) Continuation-in-part of application No. 13/098,800, filed on May 2, 2011, now abandoned.

(51) Int. Cl.
| | | |
|---|---|---|
| A47B 1/00 | (2006.01) | |
| A61G 1/013 | (2006.01) | |
| A01K 29/00 | (2006.01) | |
| A61G 1/01 | (2006.01) | |
| A62B 99/00 | (2009.01) | |

(52) U.S. Cl.
CPC ............. *A61G 1/013* (2013.01); *A01K 29/00* (2013.01); *A61G 1/01* (2013.01); *A62B 99/00* (2013.01)

(58) Field of Classification Search
CPC .......... A45C 9/00; A45C 13/26; A45C 13/30; A47G 9/062; A47G 15/003; A47G 5/006; A47G 7/002; A47G 9/10; A61G 1/00; A61G 1/01; A61G 1/013; A61G 1/048

USPC ............. 5/419, 417, 420, 485, 482, 625, 627; 383/4; 190/1, 2; 119/843
See application file for complete search history.

(56) References Cited

U.S. PATENT DOCUMENTS

| | | | | |
|---|---|---|---|---|
| 2,105,319 | A * | 1/1938 | Hedden et al. | 190/1 |
| 2,315,126 | A * | 3/1943 | Michalke | 5/417 |
| 2,540,165 | A * | 2/1951 | Fiel | 190/111 |
| 2,675,564 | A * | 4/1954 | Hughes | 5/627 |
| 4,375,111 | A * | 3/1983 | Hall | 5/419 |
| 5,199,120 | A * | 4/1993 | Holmes | 5/419 |
| 5,210,891 | A * | 5/1993 | Avital et al. | 5/420 |
| 5,720,057 | A * | 2/1998 | Duncan | 5/420 |
| 5,720,303 | A * | 2/1998 | Richardson | 128/870 |
| 6,193,034 | B1 * | 2/2001 | Fournier | 190/107 |
| 6,334,519 | B1 * | 1/2002 | Tong | 190/107 |
| 6,484,912 | B2 * | 11/2002 | Jones | 224/153 |
| 6,948,203 | B2 * | 9/2005 | Tsai | 5/627 |
| 7,798,323 | B1 * | 9/2010 | McCann et al. | 206/370 |
| 8,118,201 | B1 * | 2/2012 | Calkin | 224/156 |
| D658,361 | S * | 5/2012 | Kontos | D3/203.1 |
| 2002/0162171 | A1 * | 11/2002 | Faz | 5/627 |
| 2007/0051760 | A1 * | 3/2007 | Woodruff | 224/153 |

* cited by examiner

*Primary Examiner* — Robert G Santos
*Assistant Examiner* — Myles Throop
(74) *Attorney, Agent, or Firm* — Dale J. Ream

(57) ABSTRACT

A portable stretcher apparatus includes a pack having a first portion and a second portion removably coupled to said first portion with a fastener, said pack defining an internal compartment when said first portion is coupled to said second portion. The pack may be made of a suitable material such as canvas, vinyl or plastic. The pack may have straps, handles, grips or the like. The pack may contain a variety of first aid products and medicine for animals. The pack may also contain a stretcher that is collapsible and situated within storage compartment defined by the pack.

18 Claims, 2 Drawing Sheets

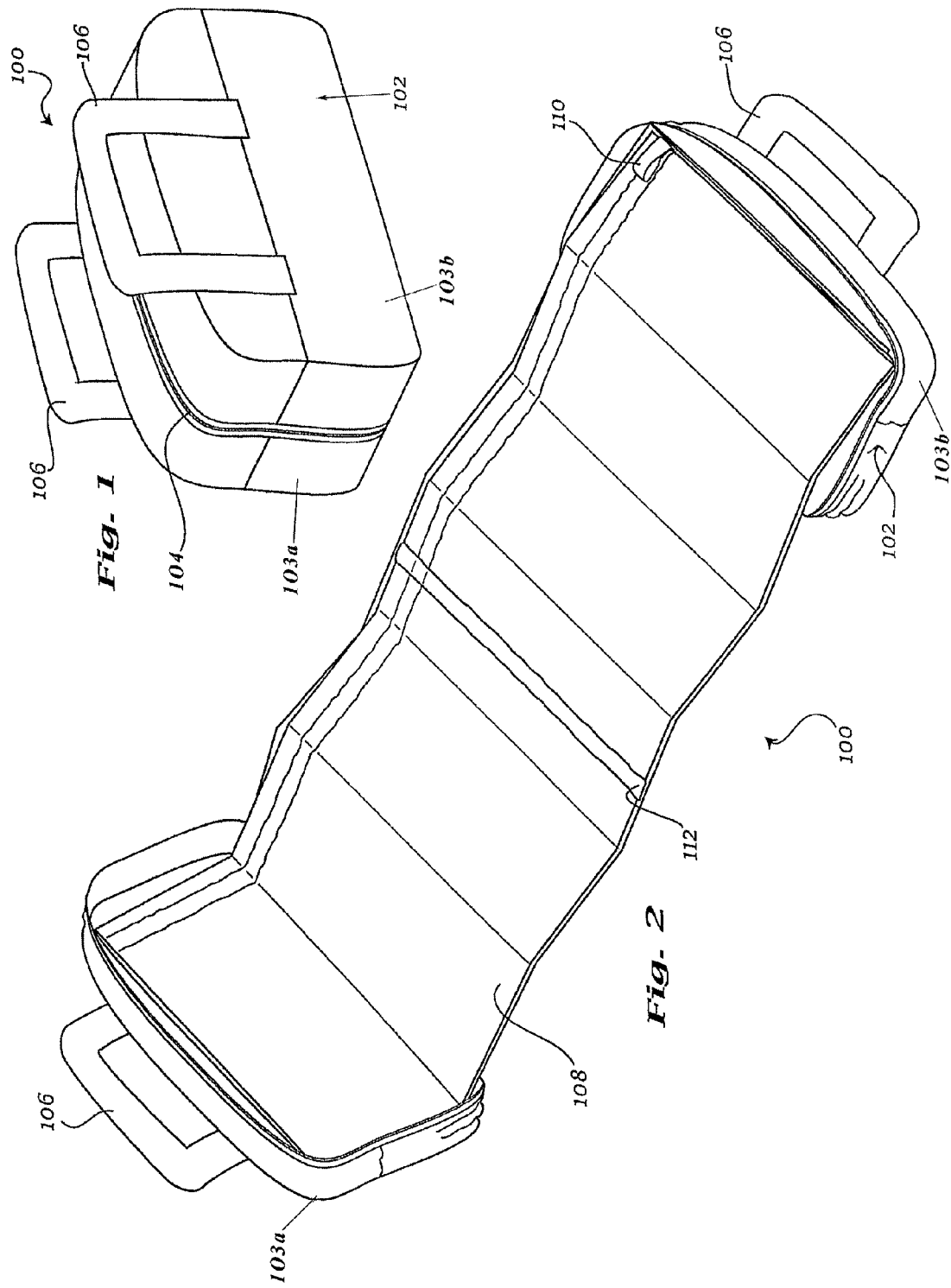

APPARATUS FOR CARING FOR AND CARRYING AN ANIMAL

CROSS REFERENCE TO RELATED APPLICATIONS

This patent application is a Continuation-in-Part of and claims the priority of U.S. Non-provisional patent application Ser. No. 13/098,800, filed on May 2, 2011 titled "Method, System, and Apparatus for Carrying" which claims the priority of U.S. Provisional Patent Application No. 61/329,607, filed on Apr. 30, 2010 which is incorporated by reference in its entirety herein.

BACKGROUND

The present invention relates generally to pet treatment devices and systems and, more particularly, to a portable apparatus supplied with items for treatment of a sick or injured animal and that may be used as a stretcher for the animal if needed.

Many people today own at least one pet that they consider part of the family. When a pet becomes injured or sick, concerned owners will do everything they can to care for them including providing medication, comfort, or even visiting a veterinary clinic. While most owners keep pet medicine or first aid materials at home, as well as use the services of a local veterinarian, problems arise if a pet becomes sick or injured in a remote location such as while on a hike, camping trip, vacation or the like.

For instance, a dog, or any other animal, may injure a limb or ingest a harmful substance on a remote hike and become immobile. Some dogs can weigh in excess of 100 pounds, making it very difficult to safely move the animal without assistance. Further, if the animal has ingested a poisonous substance, the animal's condition may rapidly deteriorate without quick and proper medication or treatment.

Therefore, it would be desirable to have an apparatus specifically supplied with and configured for caring for a sick or injured pet and, if need be, to carry the pet in the manner of a stretcher. Further, it would be desirable to have an apparatus that may be carried by a user in the manner of a backpack when not in use. In addition, it would be desirable to have an apparatus for caring for a pet that is substantially waterproof.

SUMMARY

A portable apparatus for caring for and carrying an animal includes a pack having a handle, a sealing mechanism, and a compartment defined by the pack. The pack may be assembled with a variety of materials and products for treatment or care of a sick or injured animal. The pack may have a collapsible stretcher, first aid materials, medication and the like for treatment and care of a sick or injured animal.

Therefore, a general object of this invention is to provide an apparatus for caring for and carrying an animal.

Another object of this invention is to provide a carrying apparatus, as aforesaid, having a stretcher situated inside a wearable pack.

Still another object of this invention is to provide a carrying apparatus, as aforesaid, configured to carry supplies for caring for a wounded animal.

Other objects and advantages of the present invention will become apparent from the following description taken in connection with the accompanying drawings, wherein is set forth by way of illustration and example, embodiments of this invention.

BRIEF DESCRIPTION OF THE FIGURES

FIG. 1 is a perspective view of an apparatus for caring for an animal according to a preferred embodiment of the present invention, illustrated in a closed configuration;

FIG. 2 is another perspective view of the apparatus as in FIG. 1, illustrated in an open and extended configuration.

DETAILED DESCRIPTION

Figure 3:
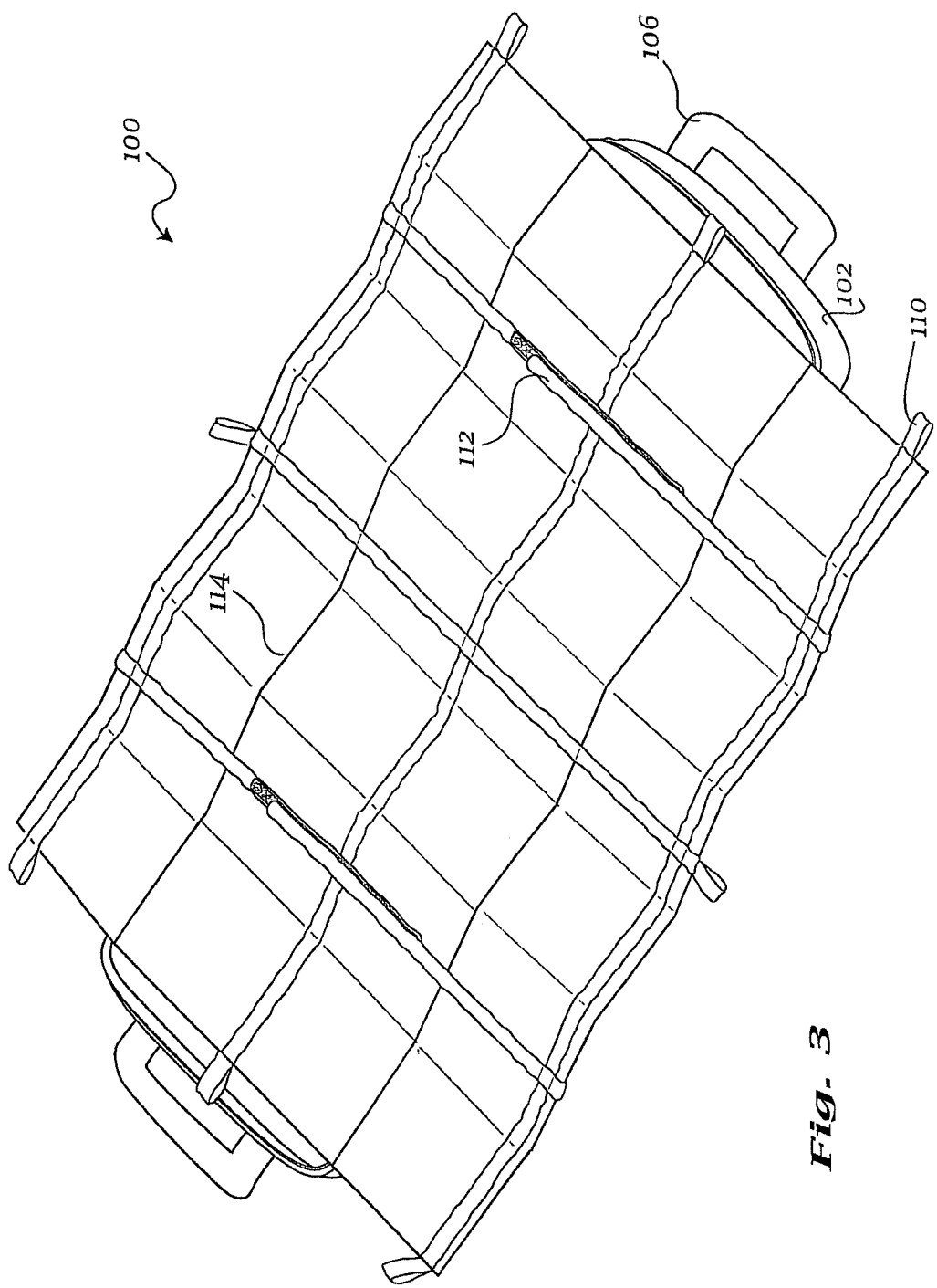
FIG. 3 is a perspective view of the apparatus as in FIG. 2, illustrated with a stretcher deployed.

An apparatus for caring for and selectively carrying an animal will now be described in detail with reference to FIGS. 1 to 3 of the accompanying drawings. The apparatus 10 includes a pack 100 and a stretcher 108 situated inside the pack 100.

The pack 100 may includes a body member 102 having a first portion 103a and a second portion 103b, the portions being releasably coupled with a zipper 104 although it is understood that other fasteners may also be suitable, such as buttons, clasps, hook and loop fasteners and the like. The body member 102, when closed or joined together may be in the form of a portable bag, suitcase, package, backpack, or case. The pack 100 may come in a variety of sizes and may be constructed of a suitable material such as canvas, vinyl or plastic, or any other material or combination of materials, as desired. In one embodiment, the pack 100 may be formed so as to be substantially water proof or weather proof.

The pack 100 may include handles 106 or any other form of straps, grips or the like to aid a user in carrying the pack 100. Each portion of the pack 100 includes upstanding walls that, together, define an interior space, also referred to herein as a "compartment." The compartment, therefore, may be accessed by releasing the fastener 104. In other words, when opened, the pack 100 may be considered as a housing, a singular storage compartment or may include any desired number of individual storage compartments, pockets or the like housed within the pack 100 (not shown).

Further, the pack 100 may be carried as a bag or hand bag, as a backpack or as a fanny pack. Thus, in some embodiments, the arrangement, orientation, attachment and number of handles 106 may be varied. For example a backpack may have two shoulder straps and a fanny pack may have a single belt-like strap.

Referring now to exemplary FIGS. 1 and 2, the pack 100 may be opened and can contain any variety of first aid products and medicine therein (not shown), as well as any other desired items. For example, the pack 100 may contain, but is not limited to, a first aid booklet for animals, hot and cold compresses, adhesive tape, latex free gloves, scissors, split rolls, syringes, peroxide, activated charcoal, sterilizing wash, diphenhydramine HCl, eye wash, sterile dressings, rolled gauze bandages, vet wrap, a warming blanket, antibiotic ointment, electrolyte tablets and the like. The amount, size or dosage of the first aid products and medicines may be adjustable, as desired.

Additionally, the pack 100 can contain any equipment desired to immobilize, tranquilize, or render unconscious an animal. In still other exemplary embodiments, pack 100 may include one or more kits for field dressing an animal. In still further exemplary embodiments, the pack 100 may contain any desired materials relevant to or tailored to specific interests or lines of work, for example animal, wildlife or outdoors research, farming, or hunting.

Referring now to FIG. 2, pack 100 may be opened, for example using zipper 104. After pack 100 is opened, a stretcher 108 housed in the compartment may be accessed. The stretcher 108 may be a collapsible stretcher that may fit within at least a storage compartment of the pack 100. The stretcher 108 may include a variety of shapes or sizes, for example substantially rectangular. Preferably, the stretcher 108 is constructed of a durable material such as canvas, vinyl, plastic or the like. Stretcher 108 may be removed from pack 100 and unfolded for use. Alternatively, the stretcher 108 may be an integral part of pack 100 that may be unfolded for use. Additionally, the stretcher 108 may be removably coupled to an interior compartment of pack 100, for example, with any desired combination of a zipper, buttons, clasps, or the like. The stretcher 108 may further have a plurality of segments 114 along which stretcher 108 may be folded and into which any desired reinforcement material may be utilized or coupled. The stretcher 108, therefore, is movable between a folded configuration and an extended configuration. In fact, the stretcher 108 may be folded to be wider than the width of the portions 103a, 103b of the pack 100.

The stretcher 108 may include one or more carrying straps 110, handles, grips or the like coupled to one or more sides that may assist in transporting the stretcher. In addition, one or more ends of stretcher 108 may be fastened together which may allow a person to drag the stretcher 108. The stretcher 108 may also have securing straps 112, hook and loop fasteners, buttons, clasps or the like that may extend across the stretcher 108 that may help secure the contents or occupant in the stretcher 108. The stretcher 108 may be reusable, and may be folded or collapsed and placed back in pack 100 after any use.

Referring now to FIG. 3, an exemplary view of pack 100 with the stretcher 108 unfolded is shown. In this example, the stretcher 108 may remain integrally attached to an interior surface of the pack 100, may be removably coupled to the pack 100, or may be separated from the pack 100, as described above. More particularly, the stretcher 108 includes a first end coupled to the first portion 113a of the pack 100 and a second end longitudinally opposed to the first end that is coupled to the second portion 113b of the pack 100 (FIG. 2). When the first portion 113a is separated from the second portion 113b, the portions may be completely separated such that the stretcher is selectively extended to an elongate configuration therebetween.

Additionally, the stretcher 108 can have any number of carrying straps 110, which may be used to help in the carrying or dragging of the stretcher 108 when it is occupied by a person or animal. The carrying straps 110 may be positioned at any desired locations on the stretcher 108, such as at the corners and center of the stretcher 108, thereby distributing the weight that a number of people can carry. More particularly, the stretcher 108 includes peripheral edges and it is preferred that respective carrying straps 110 are coupled to respective peripheral edges and extend away therefrom so as to be grasped by persons as needed to pull or lift the stretcher. Further, if the stretcher 108 is coupled to the pack 100, handles 106 may also be used to assist in carrying or dragging the stretcher 108 (FIG. 2). It is envisioned that a loaded stretcher 108 may be dragged by one person using any combination of handles 106 and straps 110, or may be carried by any number of people, for example two, four or six people using handles 106 and straps 110 as desired.

Still referring to exemplary FIG. 3, securing straps 112 may be disposed on the stretcher 108 in such a manner as they allow for the securing of an animal who is occupying the stretcher 108. For example, a first securing strap 112 may be used to secure the torso, chest and/or arms of an occupant of the stretcher 108 and a second auxiliary strap 112 may be used to secure the legs or waist of an occupant. Similarly, if an animal is placed on stretcher 108, a first securing strap 112 may be used to secure the upper body of the animal and a second securing strap 112 may be used to secure the lower body of the animal. However, it is envisioned that any number of securing straps 112 may be disposed at any location of stretcher 108 so as to provide with any desired ability to secure an animal.

Still referring to exemplary FIG. 3, the stretcher 108 may be constructed in any size. It is envisioned that the pack 100 may be formed having any desired dimensions and capacity, and the stretcher 108 may be formed in a complimentary size. Exemplary sizes of the stretcher 108 may be such that they would be capable of carrying small animals, such as dogs, or larger animals, such as deer. Further, the stretcher 108 may be formed so as to have any desired weight capacity, for example about 40 lbs to about 300 lbs.

The foregoing description and accompanying drawings illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A portable stretcher apparatus, comprising:
    a pack having a first portion and a second portion removably coupled to said first portion with a fastener, said pack defining an internal compartment when said first portion is coupled to said second portion;
    a handle coupled each to said first portion of said pack and to said second portion of said pack; and
    a stretcher situated within said compartment and having a peripheral edge, said stretcher having at least one carrying strap coupled to and extending away from said peripheral edge and at least one securing strap extending across said stretcher;
    wherein said stretcher includes a first end coupled to said first portion of said pack and a longitudinally opposed second end coupled to said second portion such that said stretcher selectively extends to an elongate configuration between said first portion and said second portion when said first portion is not coupled to said second portion.

2. The portable stretcher apparatus of claim 1, wherein said stretcher is removably positioned in said compartment defined by said pack.

3. The portable stretcher apparatus of claim 1, wherein said stretcher is formed integrally with said pack.

4. The portable stretcher apparatus of claim 1, further comprising a first aid kit housed in said compartment defined within said pack.

5. The portable stretcher apparatus of claim 1, wherein said pack is constructed of one of canvas, vinyl or plastic.

6. The portable stretcher apparatus of claim 1, wherein said pack is substantially waterproof.

7. The portable stretcher apparatus of claim 1, wherein said stretcher is constructed of at least one of canvas, vinyl or plastic.

8. The portable stretcher apparatus of claim 1, further comprising a field dressing kit situated in said compartment defined by said pack.

9. The portable stretcher apparatus of claim 1, further comprising a tranquilizer kit housed in said compartment defined within said pack.

10. The portable stretcher apparatus of claim 1, wherein said stretcher includes a plurality of segments such that said stretcher is movable between a folded configuration and an extended configuration.

11. A collapsible apparatus for carrying an animal, comprising:
- a stretcher constructed of a flexible material and having a substantially rectangular configuration and having a peripheral edge;
- at least one carrying strap coupled to and extending away from said peripheral edge;
- at least one securing strap coupled to and extending away from said peripheral edge; and
- a pack coupled to said stretcher, said pack having a first portion and a second portion removably coupled to said first portion with a fastener, said pack defining an internal compartment enclosing said stretcher when said first portion is coupled to said second portion;
- wherein said stretcher includes a first end coupled to said first portion of said pack and a longitudinally opposed second end coupled to said second portion such that said stretcher selectively extends to an elongate configuration between said first portion and said second portion when said first portion is not coupled to said second portion.

12. The collapsible stretcher of claim 11, further comprising a first aid kit housed in said compartment in said pack.

13. The collapsible stretcher of claim 11, wherein said pack is removably coupled to said stretcher.

14. The collapsible stretcher of claim 11, wherein said stretcher includes a plurality of segments such that said stretcher is movable between a folded configuration and an extended configuration.

15. The collapsible stretcher of claim 11, wherein said pack is constructed of one of canvas, vinyl or plastic.

16. The collapsible stretcher of claim 11, wherein said pack is substantially waterproof.

17. The collapsible stretcher of claim 11, wherein said stretcher is constructed of one of canvas, vinyl or plastic.

18. The collapsible stretcher of claim 11, further comprising a tranquilizer kit housed in said compartment defined within said pack.

* * * * *